(12) United States Patent
Nakai

(10) Patent No.: US 12,039,214 B2
(45) Date of Patent: Jul. 16, 2024

(54) IMAGE FORMING APPARATUS, COMMUNICATION CONTROL METHOD, AND STORAGE MEDIUM

(71) Applicant: CANON KABUSHIKI KAISHA, Tokyo (JP)

(72) Inventor: Hironobu Nakai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/467,103

(22) Filed: Sep. 14, 2023

(65) Prior Publication Data

US 2024/0118849 A1 Apr. 11, 2024

(30) Foreign Application Priority Data

Oct. 7, 2022 (JP) ................................. 2022-162668

(51) Int. Cl.
*G06F 3/12* (2006.01)
(52) U.S. Cl.
CPC .......... *G06F 3/1288* (2013.01); *G06F 3/1203* (2013.01); *G06F 3/1234* (2013.01); *G06F 3/1292* (2013.01)
(58) Field of Classification Search
CPC .... G06F 3/1288; G06F 3/1203; G06F 3/1234; G06F 3/1292
See application file for complete search history.

(56) References Cited

U.S. PATENT DOCUMENTS

| 9,311,037 B2 | 4/2016 | Kuribara |
| 2017/0346830 A1* | 11/2017 | Goldfarb ............... H04L 63/104 |
| 2019/0047307 A1* | 2/2019 | Ren ........................... G06F 3/12 |
| 2021/0306522 A1* | 9/2021 | Okuno .............. H04N 1/00384 |

FOREIGN PATENT DOCUMENTS

JP 2015054413 A 3/2015

* cited by examiner

*Primary Examiner* — John R Wallace
(74) *Attorney, Agent, or Firm* — ROSSI, KIMMS & McDOWELL LLP

(57) ABSTRACT

An image forming apparatus includes an image forming unit, a communication interface connected to a server that operates in a remote environment, a storage unit configured to store client-side registration information for connection with the server, and a control unit configured to execute a print job received from the server by controlling the image forming unit to form an image. The server communicates with the image forming apparatus using server-side registration information registered in the remote environment. The control unit determines whether the server-side registration information has been deleted in the remote environment based on a received signal received from the server, and delete the client-side registration information stored in the storage unit in a case where it is determined that the server-side registration information has been deleted in the remote environment.

13 Claims, 13 Drawing Sheets

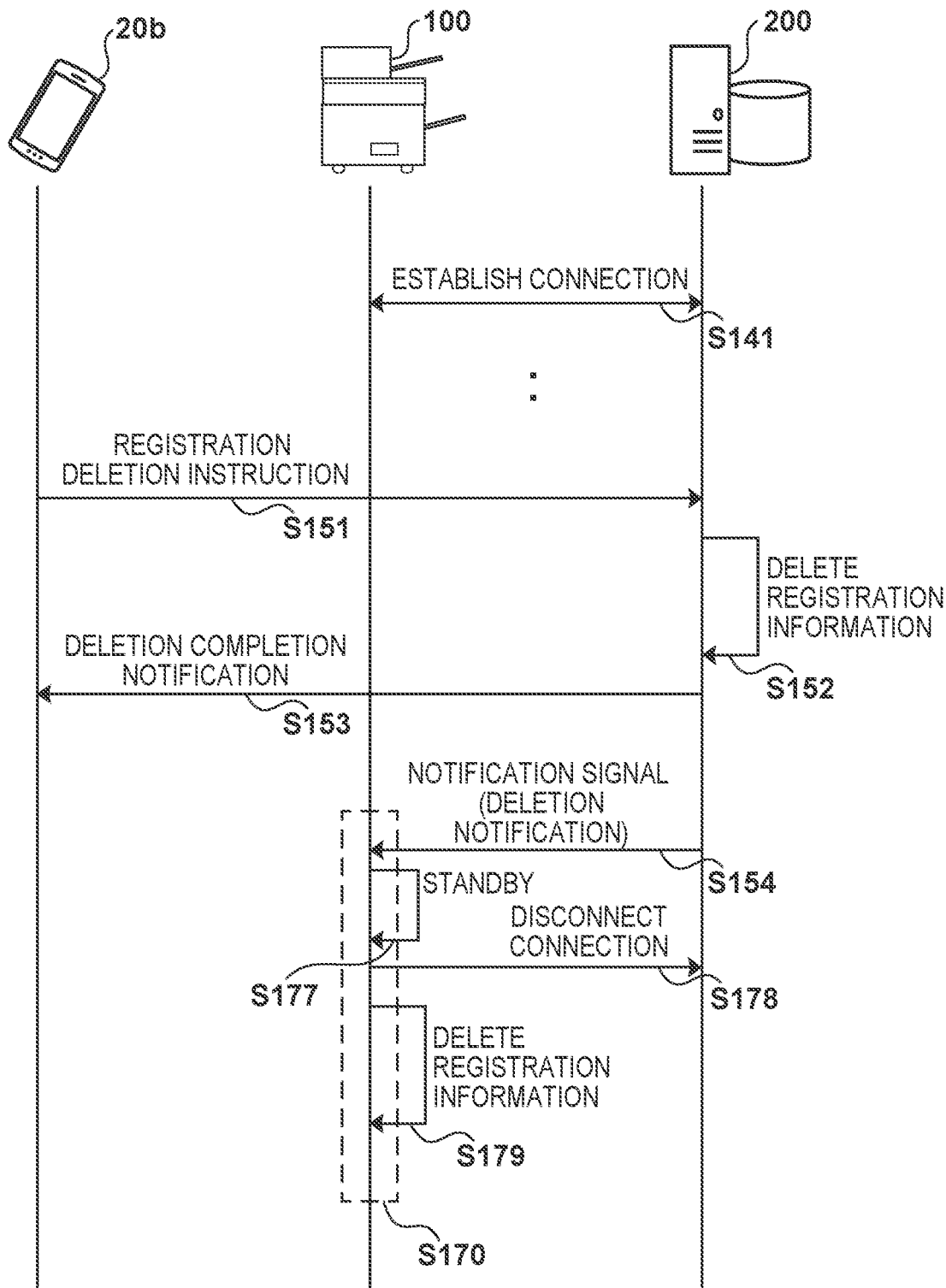

IMAGE FORMING APPARATUS, COMMUNICATION CONTROL METHOD, AND STORAGE MEDIUM

BACKGROUND OF THE INVENTION

Field of the Invention

The present disclosure relates to an image forming apparatus, a communication control method, and a storage medium.

Description of the Related Art

Conventionally, a cloud printing service has been known that accepts a print job via a cloud server that is accessible via the Internet, and causes an image forming apparatus registered with the server to execute the print job. Using the cloud printing service, a user can obtain a desired printout by issuing a print job from any terminal in which a driver of an image forming apparatus has not been installed.

Japanese Patent Laid-Open No. 2015-54413 discloses a configuration of a typical system for a cloud printing service. When registration of an image forming apparatus is deleted from a server, the system disclosed in Japanese Patent Laid-Open No. 2015-54413 confirms if there is no print job remaining in the server, prior to deletion processing, in order to avoid a situation where an unexecuted print job remains in the server.

SUMMARY OF THE INVENTION

The system disclosed in Japanese Patent Laid-Open No. 2015-54413 is based on the precondition that a user causes the image forming apparatus to transmit a registration deletion request to the server by directly operating the image forming apparatus or by accessing the image forming apparatus from a user terminal. Therefore, the image forming apparatus can certainly recognize that the registration deletion request has been made, and delete information that has been locally held for connection with the server. In contrast, it is also possible to enable deletion of information registered with the server without intervention of the image forming apparatus; however, in this case, the image forming apparatus, which is in a local environment, cannot always recognize that the registration deletion request has been made. In a case where the image forming apparatus does not recognize deletion of registration information on the server side though the deletion has been made, communication resources will be wasted by, for example, the image forming apparatus repeating an attempt to communicate with the server.

The present invention is intended to realize a mechanism to prevent the aforementioned waste of communication resources in a cloud-based printing service.

According to an aspect, there is provided an image forming apparatus, including: an image forming unit; a communication interface connected to a server apparatus that operates in a remote environment; a storage unit configured to store client-side registration information for connection with the server apparatus; and a control unit configured to, in a case where a print job has been received from the server apparatus via the communication interface, control the image forming unit to form an image by executing the print job. The server apparatus is configured to communicate with the image forming apparatus using server-side registration information which is registered in the remote environment and which is intended for the connection with the image forming apparatus. The control unit is configured to determine whether the server-side registration information has been deleted in the remote environment based on a received signal that is received from the server apparatus via the communication interface, and delete the client-side registration information stored in the storage unit in a case where it is determined that the server-side registration information has been deleted in the remote environment. A corresponding communication control method and storage medium are also provided.

Further features of the present invention will become apparent from the following description of exemplary embodiments (with reference to the attached drawings).

BRIEF DESCRIPTION OF THE DRAWINGS

FIG. 10B is a sequence diagram showing a second example of a flow of processing for preventing a waste of communication resources in the second working example.

DESCRIPTION OF THE EMBODIMENTS

Figure 1:
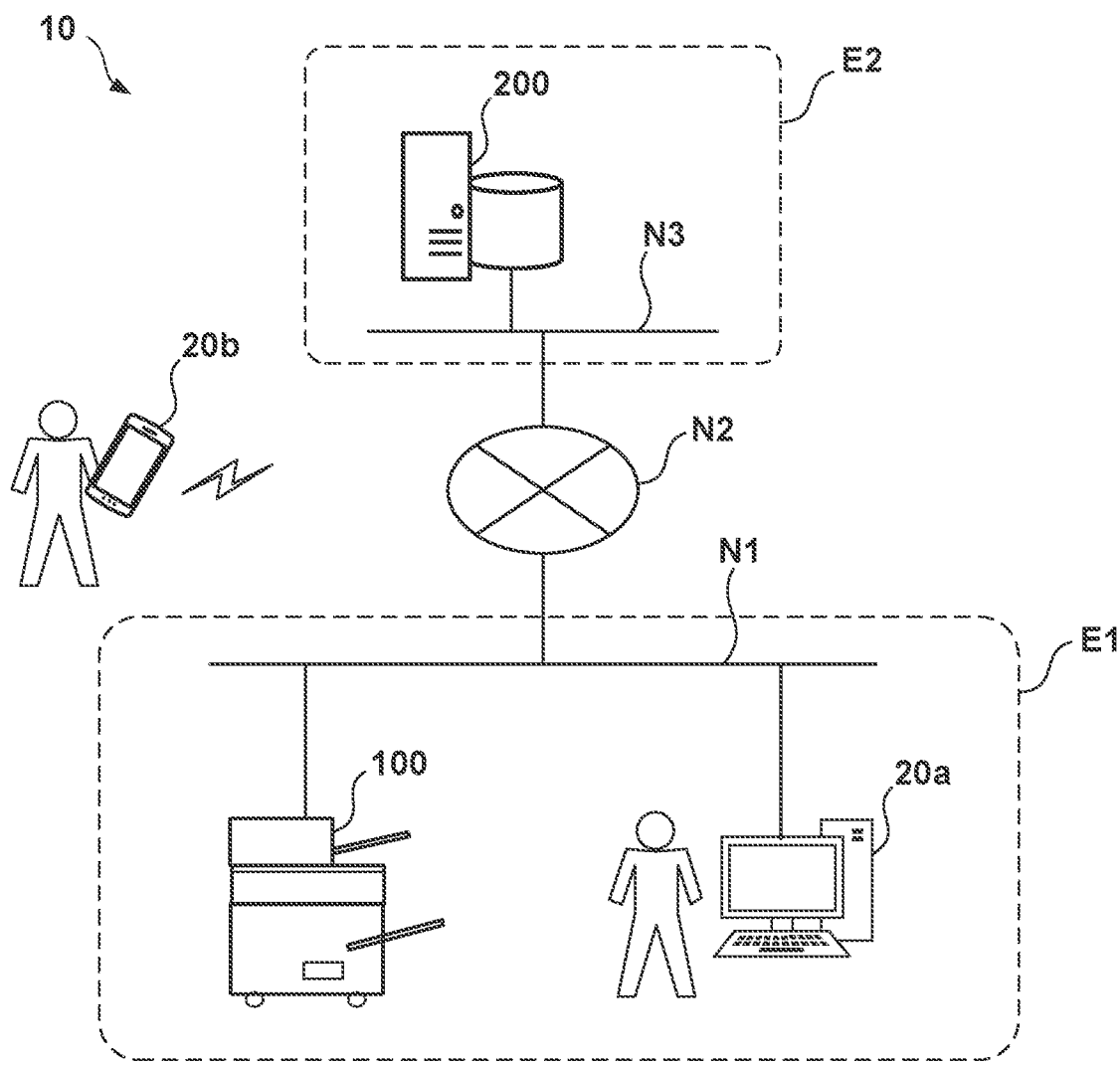
FIG. 1 is a schematic diagram showing an example of a configuration of a printing system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. Overview of System

First, an overview of a system will be described using FIG. 1. FIG. 1 is a schematic diagram showing an example of a configuration of a printing system 10 according to an embodiment. Referring to FIG. 1, the printing system 10 includes user terminals 20a and 20b, an image forming apparatus 100, and a printing server 200.

The image forming apparatus 100 is an apparatus that can form an image on a recording medium. The image forming apparatus 100 may be, for example, a printer or a digital multi-functional peripheral. The image forming apparatus 100 is placed in a local environment E1. An example of a configuration of the image forming apparatus 100 will be described below in detail.

The user terminals 20a and 20b are terminal apparatuses that are used by a user. In the example of FIG. 1, the user terminal 20a is located in the local environment E1, whereas the user terminal 20b is located outside the local environment E1. In the following description, in a case where the user terminals 20a and 20b need not be distinguished from each other, they are collectively referred to as user terminals 20 with the omission of alphabets at the end of reference signs. The user terminals 20 may be, for example, general-purpose terminal apparatuses, such as smartphones and personal computers (PC). The user terminals 20 provide, for example, a communication function of communicating with another apparatus via a network, and a UI function of displaying a graphical user interface (GUI) provided by another apparatus and accepting a user operation. Note that in the present specification, it is assumed that the term "user" is not limited to a general user who uses a printout output by the image forming apparatus 100, and also includes a personnel who is involved in the management of the image forming apparatus 100 (e.g., an engineer or a service person).

The image forming apparatus 100 and the user terminal 20a are connected to a local network N1 in the local environment E1. The local network N1 may be, for example, a local area network (LAN). The local network N1 is connected an external network N2. The external network N2 may be, for example, the Internet.

The printing server 200 is a server apparatus placed in a remote environment E2. The printing server 200 can issue a print job via a network in response to a request from the user. The printing server 200 can be implemented using, for example, a high-performance general-purpose computer. In the present embodiment, the printing server 200 is connected to the external network N2 via a cloud network N3. That is to say, the printing server 200 may be a cloud server that provides a cloud printing service. While FIG. 1 shows one printing server 200 as a virtual cloud server, the functions of the printing server 200 described in the present specification may be realized by a plurality of physically-separate server apparatuses operating in coordination with one another. An example of a configuration of the printing server 200 will be further described below.

Each of the local network N1, the external network N2, and the cloud network N3 may include any number of network apparatuses of any types, such as a router, a switch, a gateway, a firewall, a wireless access point, and a base station, for example.

2. Exemplary Configuration of Image Forming Apparatus

<2-1. Hardware Configuration>

Figure 2:
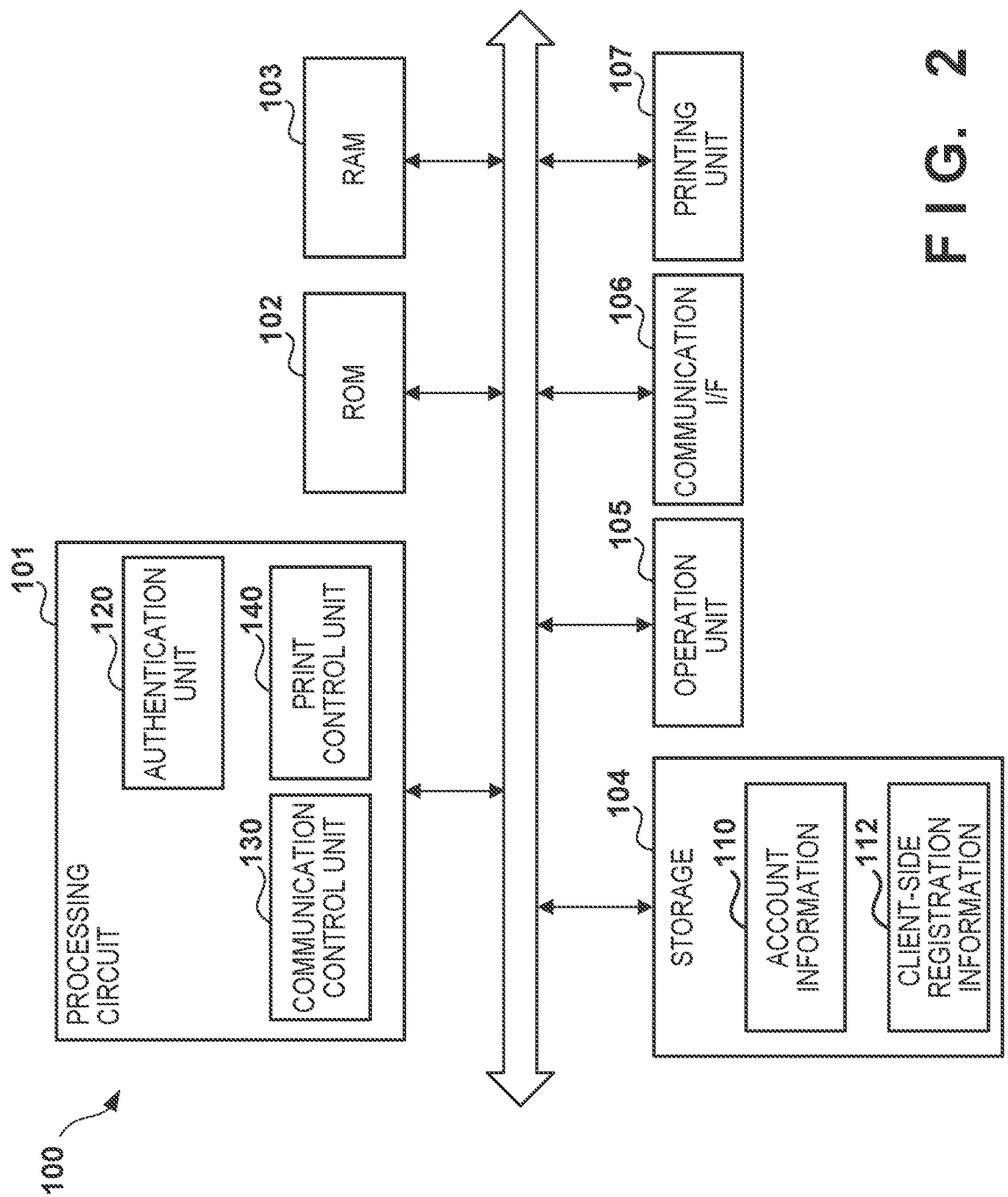
FIG. 2 is a block diagram showing an example of a configuration of an image forming apparatus according to an embodiment.

FIG. 2 is a block diagram showing an example of a configuration of the image forming apparatus 100 according to the present embodiment. Referring to FIG. 2, the image forming apparatus 100 includes a processing circuit 101, a ROM 102, a RAM 103, a storage 104, an operation unit 105, a communication interface (I/F) 106, and a printing unit 107.

The processing circuit 101 is a control unit that controls the overall operations of the image forming apparatus 100. The processing circuit 101 may include, for example, any combination of one or more central processing units (CPU), microcontrollers, and microprocessors. The read-only memory (ROM) 102 is a nonvolatile memory, and stores, for example, several computer programs, such as a boot program. The random-access memory (RAM) 103 is a volatile memory, and provides a temporary storage region for computation to the processing circuit 101. The storage 104 is a storage unit that can store a massive amount of data, such as a hard disk drive (HDD), for example. The storage 104 stores an operating system (OS), a device driver, and several computer programs that can include various applications.

The operation unit 105 can include input devices that accept an operation and an information input performed by the user, and output devices that output information to the user. The input devices can include, for example, one or more of a touch panel, a keypad, a button, a switch, and a microphone. The output devices can include one or more of a display that can display images and information, and a speaker that can output sounds. The communication OF 106 is an interface for the image forming apparatus 100 to communicate with another apparatus. The communication OF 106 may be a wired communication interface, or may be a wireless communication interface. The printing unit 107 is a print engine that executes a print job. The printing unit 107 can include, for example, a circuit that executes image processing, such as rendering, with respect to input image data, a conveyance mechanism that conveys a recording medium, an image forming unit that forms an image on the conveyed recording medium, a fixing unit that fixes the image on the recording medium, and a discharge mechanism that discharges the recording medium.

<2-2. Software Configuration>

In the present embodiment, the processing circuit 101 operates as several functional units related to the cloud printing service by executing a computer program that has been stored in the ROM 102 or the storage 104 in advance and has been loaded to the RAM 103. For example, the processing circuit 101 can operate as an authentication unit 120, a communication control unit 130, and a print control unit 140. Also, the storage 104 stores information that is necessary to use the cloud printing service. For example, the storage 104 can store account information 110 and client-side registration information 112.

Note that in other embodiments, a part or all of the functions of the processing circuit 101 described here may be implemented using a hardware circuit, such as an application specific integrated circuit (ASIC) or a field programmable gate array (FPGA).

Using the account information 110 stored in the storage 104, the authentication unit 120 performs user authentication with respect to a user who uses the image forming apparatus 100. For example, the authentication unit 120 checks a user ID and a password that have been input via a user interface (UI) against the account information 110, and permits a user who has input an appropriate combination of a user ID and a password to use the image forming apparatus 100. The authentication unit 120 may execute user authentication in coordination with an external authentication service. Furthermore, in a case where a user is attempting to use the cloud printing service provided by the printing server 200 via the image forming apparatus 100, the authentication unit 120 logs into the cloud printing service based on the account information 110.

The communication control unit 130 controls communication between the image forming apparatus 100 and another apparatus via the communication OF 106. For example, the communication control unit 130 controls local connection with the user terminal 20a that is located in the local environment E1, and remote connection with the printing server 200 that operates in the remote environment E2.

In the present embodiment, a user of the printing system 10 can instruct the image forming apparatus 100 to register the image forming apparatus 100 with the cloud printing service via the operation unit 105 of the image forming apparatus 100 or a UI provided by the user terminal 20. In a case where this registration instruction has been accepted, the communication control unit 130 transmits registration information that includes at least identification information for identifying the image forming apparatus 100 to the printing server 200 via the communication OF 106, and causes the printing server 200 to register server-side registration information therewith. The server-side registration information can include, for example, one or more of the followings:

Identification information of image forming apparatus
  Name of apparatus
  Other identifiers
Connection information
  Network address (e.g., IP address or MAC address)
  Uniform resource identifier (URI) for service access
  Subscription ID
Authentication information
  Login password
  Authentication token Furthermore, the communication control unit 130 causes the storage 104 to store the client-side registration information 112 therein. The client-side registration information 112 can include, for example, at least one of the following.

Name of cloud printing service
Connection information
  URI for service access
  Subscription ID
Authentication information
  Login password
  Authentication token After the printing server 200 has registered the server-side registration information, the communication control unit 130 can connect to the printing server 200 using the client-side registration information 112 stored in the storage 104. In a first working example to be described below, the printing server 200 provides the cloud printing service to the image forming apparatus 100 using a so-called pull approach. In this case, the communication control unit 130 causes the communication OF 106 to periodically transmit a query signal to the printing server 200. The printing server 200 returns a response signal to the query signal received from the image forming apparatus 100. These query signal and response signal may be, for example, a request and a response that conform with the hypertext transfer protocol (HTTP) or the Internet printing protocol (IPP). In a scene in which ensuring of communication securities is required, the HTTPS or the IPPS may be used. In a case where there is a print job to be executed by the image forming apparatus 100, the printing server 200 can include this print job in this response signal to transmit it to the image forming apparatus 100. In a case where such a communication method using the pull approach is adopted, connection between the image forming apparatus 100 and the printing server 200 is temporary connection that is established each time a request is transmitted.

In a second working example to be described below, the printing server 200 provides the cloud printing service to the image forming apparatus 100 using a so-called push approach. In this case, the communication control unit 130 causes the communication OF 106 to periodically transmit a connection signal for maintaining connection to the printing server 200. While the connection signal is transmitted periodically, the connection (e.g., TCP connection) with the printing server 200 is continuously maintained. For example, the Web Socket technology, which has been standardized by the IETF as RFC 6455, may be used to maintain the connection between the image forming apparatus 100 and the printing server 200. In this case, a keepalive signal according to the Web Socket technology is a type of a connection signal. In a case where there is a print job to be executed by the image forming apparatus 100, the printing server 200 can transmit this print job to the image forming apparatus 100 using the connection that has been maintained with the image forming apparatus 100.

The print control unit 140 controls the execution of a print job on the image forming apparatus 100. For example, in a case where an instruction for executing a print job has been issued via a UI provided by the operation unit 105 or the user terminal 20, the print control unit 140 controls the printing unit 107 to form an image in accordance with the accepted print job. Also, in a case where the image forming apparatus 100 has been registered with the cloud printing service of the printing system 10, a print job can be received also from the printing server 200. In a case where a print job has been received from the printing server 200 via the communication OF 106, the print control unit 140 controls the printing unit 107 to form an image in accordance with the received print job.

The image forming apparatus 100 provides a user with GUIs related to the execution of the print job on the image forming apparatus 100. For example, the GUIs provided to the user can include one or more of the followings:

Home screen for calling up printing, copying, and other functions of image forming apparatus
Setting screen for setting parameters for job (e.g., the number of copies to be printed, color mode, and so forth)
Registration management screen for issuing instruction for registering image forming apparatus with cloud printing service, and deleting the registration
Other screens These GUIs may be displayed by the operation unit 105, or may be displayed by a display of the user terminal 20 connected via the communication OF 106. A UI displayed by the display of the user terminal 20 is also referred to as a remote UI. GUIs to be provided to each user may be selectively restricted depending on the authorities associated with user accounts (e.g., general users or an administrator).

3. Exemplary Configuration of Printing Server

Figure 3:
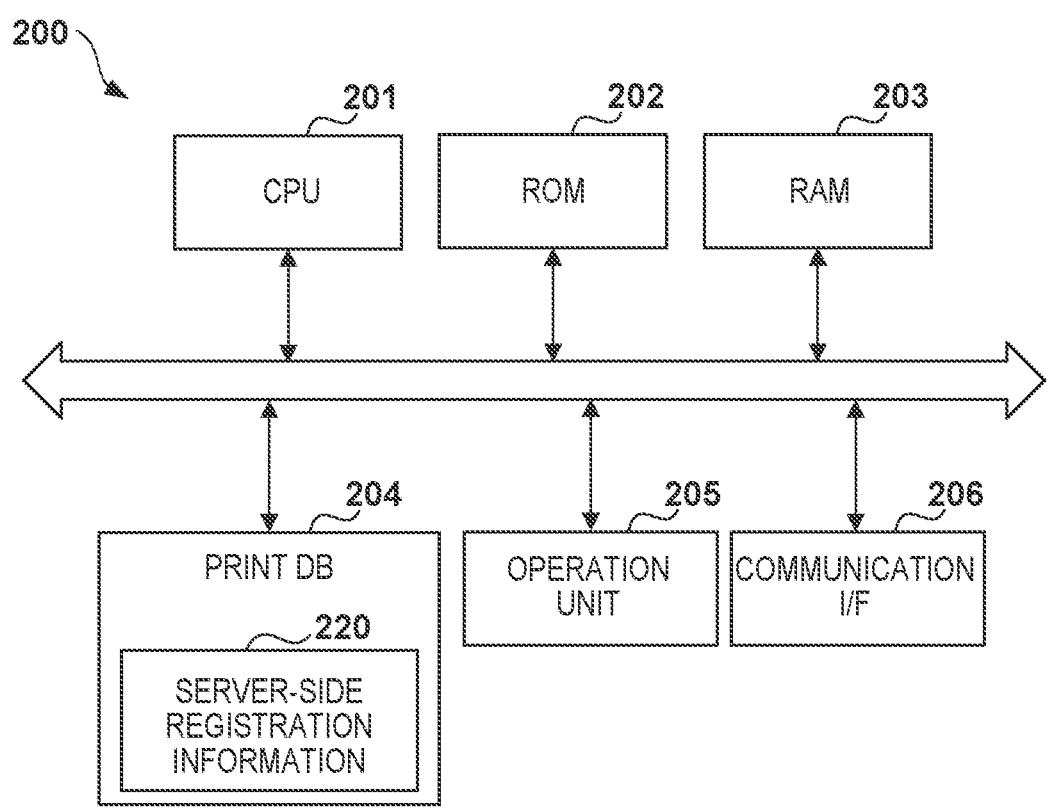
FIG. 3 is a block diagram showing an example of a configuration of a printing server according to an embodiment.

FIG. 3 is a block diagram showing an example of a configuration of the printing server 200 according to the present embodiment. Referring to FIG. 3, the printing server 200 includes a CPU 201, a ROM 202, a RAM 203, a print database (DB) 204, an operation unit 205, and a communication OF 206.

The CPU 201 is a control unit that controls the overall operations of the printing server 200. The ROM 202 is a nonvolatile memory, and stores, for example, several computer programs, such as a boot program. The RAM 203 is a volatile memory, and provides a temporary storage region for computation to the CPU 201. The print DB 204 is a database that stores various types of data that are required to provide the cloud printing service in the printing system 10. Although FIG. 3 shows an example in which the printing server 200 includes the print DB 204, a data server that is separate from the printing server 200 may include the print DB 204. In the example of FIG. 3, the print DB 204 can store server-side registration information 220.

The operation unit 205 can include input devices that accept an operation and an information input performed by an administrator of the printing server 200, and output devices that output information. The communication OF 206 is an interface for the printing server 200 to communicate with another apparatus. The communication OF 206 may be a wired communication interface, or may be a wireless communication interface.

The CPU 201 operates as a functional unit of the printing server 200 for providing the cloud printing service by executing a computer program stored in the memory. For example, the CPU 201 receives a signal that requests registration with the cloud printing service from the image forming apparatus 100 via the communication OF 206. In response, the CPU 201 issues connection information for later connection with the image forming apparatus 100, as well as authentication information, and provides the issued pieces of information to the image forming apparatus 100. The connection information issued here can include, for example, a URI for service access, and a subscription ID for identifying an individual registration. The authentication information can include, for example, one or both of a login password and an authentication token, depending on a required authentication method. The CPU 201 registers the connection information and the authentication information as the server-side registration information 220 with the print DB 204 in association with identification information that identifies the requesting image forming apparatus 100. This enables the printing server 200 to communicate with the image forming apparatus 100, which has been registered as an entity that uses the cloud printing service, with use of the server-side registration information 220.

After the image forming apparatus 100 has been registered with the print DB 204, the CPU 201 waits for a print request which is received from the user terminal 20 via the communication OF 206, and which requests execution of a print job. Then, in a case where the print request has been received, the CPU 201 transmits a print job that has been requested to be executed to the image forming apparatus 100 designated in the print request via the communication OF 206. In the first working example, which is based on the precondition that the service is provided using the pull approach, a print job is transmitted to the image forming apparatus 100 in response to a query signal received from the image forming apparatus 100, as stated above. In the second working example, which is based on the precondition that the service is provided using the push approach, a print job is transmitted to the image forming apparatus 100 using connection that is continuously maintained (e.g., TCP connection) with the image forming apparatus 100, as stated above.

The printing server 200 provides a user with GUIs related to the provision of the cloud printing service. For example, the GUIs provided to the user can include one or more of the followings:

Print request screen for requesting issuance of print job to a designated image forming apparatus Registration management screen for issuing instruction for registering a designated image forming apparatus with cloud printing service, and deleting the registration Other screens These GUIs are made accessible from both the inside and the outside of the local environment E1. For example, in response to an instruction received from the user terminal 20b that is located outside the local environment E1, the printing server 200 can register registration information of a designated image forming apparatus with the print DB 204, and delete the registration information from the print DB 204.

Note that although the present specification provides a description of an example in which several user interfaces are provided as GUIs, other types of UIs, such as a command line interface (CLI) and a sound UI, may be provided in place of or in addition to the GUIs. Furthermore, the screens of GUIs may be screens of any form, such as a web page, an input form, and a dedicated application screen, for example.

4. Flow of Procedure Related to Provision of Service

<4-1. Service Registration and Execution of Job>

Figure 4:
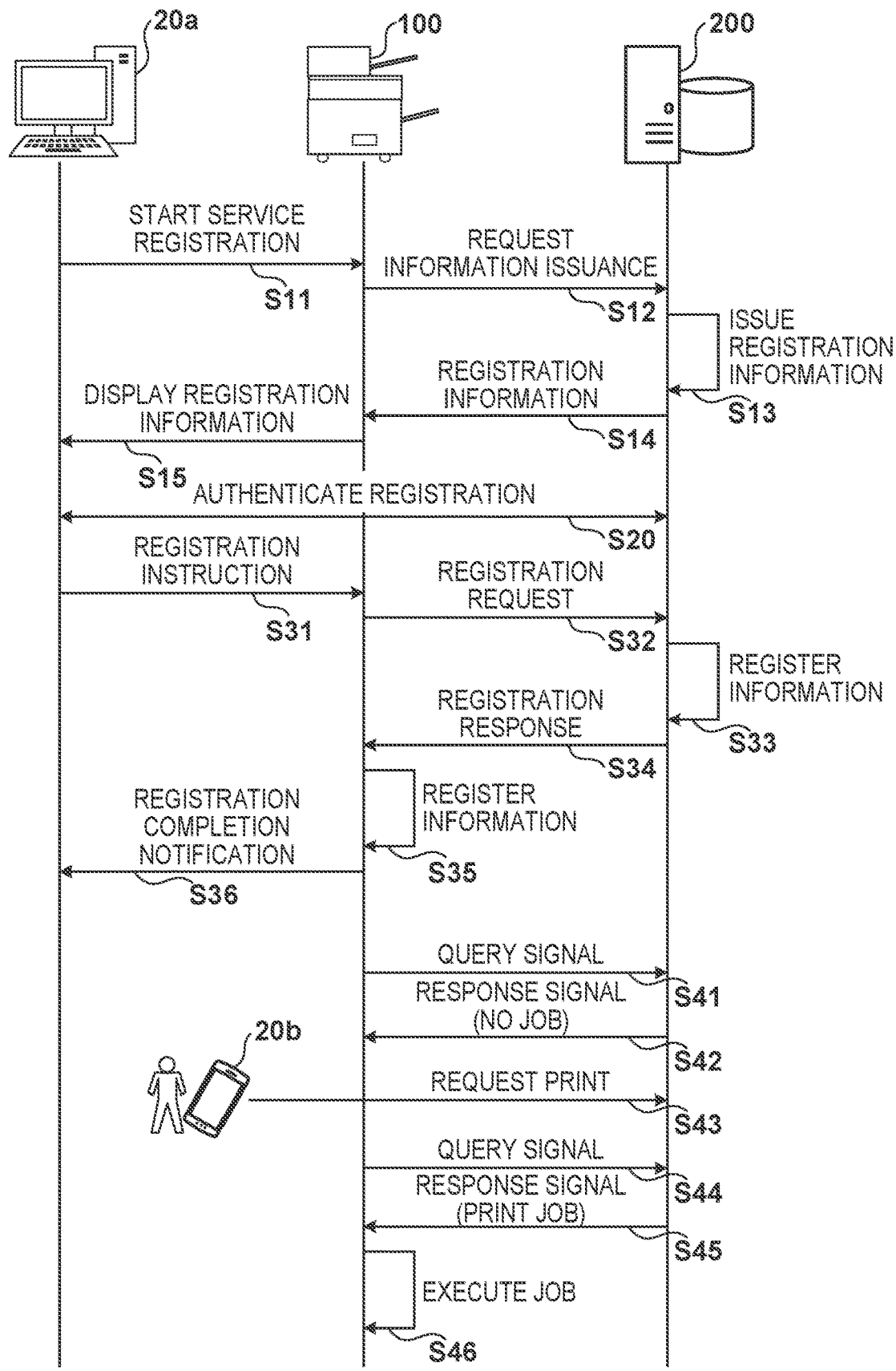
FIG. 4 is a sequence diagram showing an example of a flow of a procedure related to service registration and job execution in the printing system.

FIG. 4 shows an example of a flow of a procedure related to service registration and job execution in the printing system 10. The user terminal 20a, the image forming apparatus 100, the printing server 200, and the user terminal 20b are involved in the procedure shown in FIG. 4. In the following description, a processing step is abbreviated as "S".

First, in step S11, a user accesses a registration management screen of the image forming apparatus 100 using the user terminal 20a, and instructs the image forming apparatus 100 to start a procedure for registration of the image forming apparatus 100 with the cloud printing service. In response to the instruction from the user, the communication control unit 130 of the image forming apparatus 100 transmits an information issuance request that requests issuance of registration information, together with identification information of the image forming apparatus 100, to the printing server 200 in step S12. In step S13, the printing server 200 issues registration information for the image forming apparatus 100. The registration information issued here can include connection information and authentication information associated with the identification information of the image forming apparatus 100, as stated above. In step S14, the communication control unit 130 of the image forming apparatus 100 receives the registration information issued by the printing server 200 from the printing server 200. In step S15, the communication control unit 130 causes the display of the user terminal 20a to display the registration information received from the printing server 200.

In step S20, authentication for registration of the image forming apparatus 100 is performed between the printing server 200 and the user terminal 20a (and the image forming apparatus 100). For example, the user inputs a password issued by the printing server 200 to an input field displayed on the display of the user terminal 20a. The printing server 200 verifies the input password. In a case where the registration authentication in step S20 has been successful, the user instructs the image forming apparatus 100 to register the issued information in step S31. In response to the instruction from the user, the communication control unit 130 of the image forming apparatus 100 transmits a registration request to the printing server 200 in step S32. In step S33, the printing server 200 registers the registration information issued to the image forming apparatus 100 with the print DB 204 as server-side registration information 220. Upon completion of registration of the server-side registration information 220, the printing server 200 transmits a registration response to the image forming apparatus 100 in step S34. In step S35, the communication control unit 130 of the image forming apparatus 100 registers client-side registration information 112 with the storage 104. In step S36, the communication control unit 130 transmits, to the user terminal 20a, a registration completion notification for providing a notification about the completion of registration of the image forming apparatus 100 with the cloud printing service. The user can be notified of the completion of registration via, for example, a screen displayed on the display of the user terminal 20a.

In a state where the image forming apparatus 100 has been registered with the cloud printing service, the communication control unit 130 of the image forming apparatus 100, for example, transmits a query signal to the printing server 200 periodically. This query signal may include, for example, a report on a status of the image forming apparatus 100, such as the remaining amounts of consumable materials including toner, recording media, and the like, and whether an error has occurred. In the example of FIG. 4, the image forming apparatus 100 transmits a query signal to the printing server 200 in step S41, and the printing server 200 returns a response signal to the image forming apparatus 100 in step S42. At this time, as there is no print job that is to be executed by the image forming apparatus 100, the response signal does not include a print job.

In step S43, the user accesses a print request screen of the printing server 200 using the user terminal 20b, designates data to be printed, and transmits a print request that requests issuance of a print job to the printing server 200. When the timing of periodical transmission of a query signal has arrived, the communication control unit 130 of the image forming apparatus 100 transmits a query signal to the printing server 200 again in step S44. As there is a print job to be executed by the image forming apparatus 100, the printing server 200 transmits a response signal including this print job to the image forming apparatus 100 in step S45. In response to the reception of the print job, the print control unit 140 of the image forming apparatus 100 causes the printing unit 107 to execute the print job in step S46.

<4-2. Deletion of Service Registration>

Figure 5:
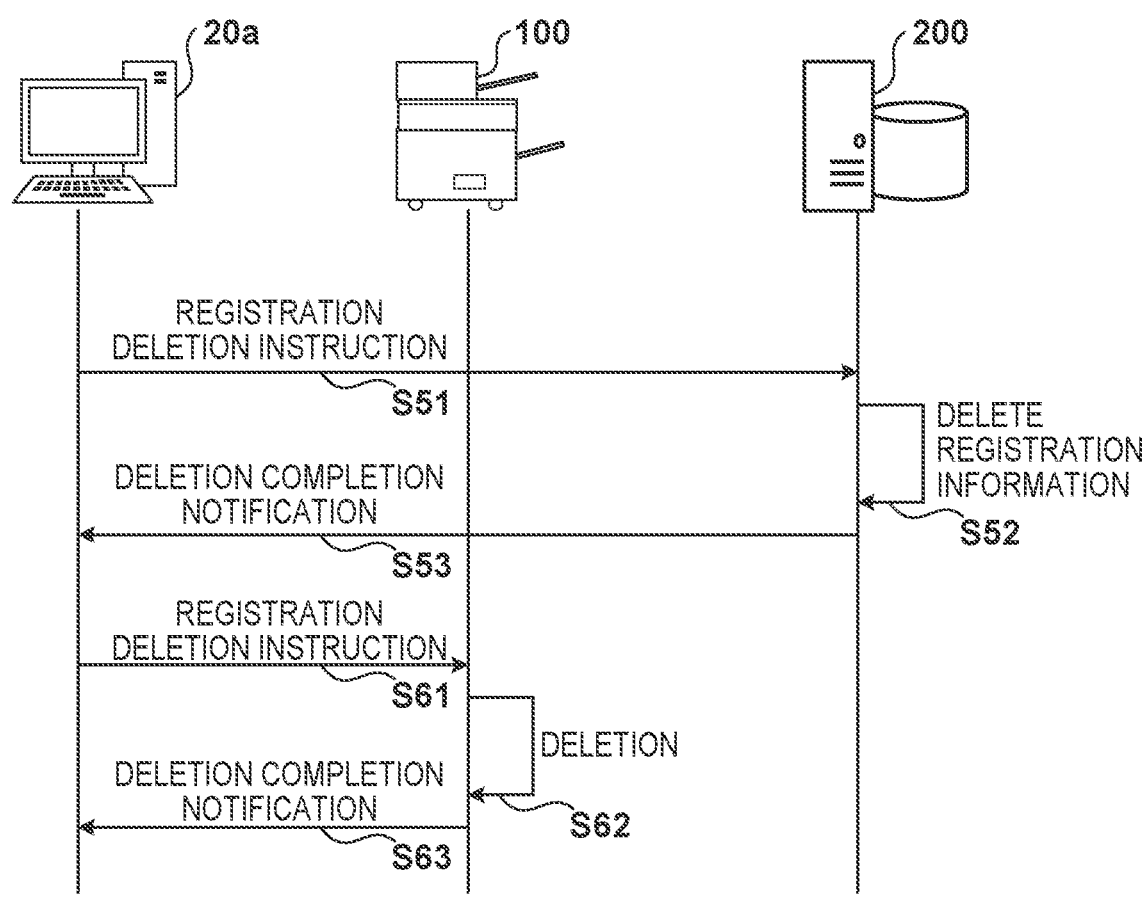
FIG. 5 is a sequence diagram showing an example of a flow of a procedure related to deletion of service registration.

FIG. 5 shows an example of a flow of a procedure related to deletion of service registration. The user terminal 20a, the image forming apparatus 100, and the printing server 200 are involved in the procedure shown in FIG. 5.

First, in step S51, the user accesses a registration management screen of the printing server 200 using the user terminal 20a, and instructs the printing server 200 to delete the registration of the image forming apparatus 100 from the cloud printing service. In response to the instruction from the user, the printing server 200 deletes the server-side registration information 220 stored in the print DB 204 in step S52. Next, in step S53, the printing server 200 transmits, to the user terminal 20a, a deletion completion notification for providing a notification about the completion of deletion of the registration information.

Similarly, in step S61, the user accesses a remote UI of the image forming apparatus 100 using the user terminal 20a, and instructs the image forming apparatus 100 to delete the registration information for the cloud printing service. In response to the instruction from the user, the communication control unit 130 of the image forming apparatus 100 deletes the client-side registration information 112 stored in the storage 104 in step S62. Next, in step S63, the communication control unit 130 transmits, to the user terminal 20a, a deletion completion notification for providing a notification about the completion of deletion of the registration information.

Inconvenience does not occur as long as the user has appropriately performed the procedure of registration deletion with respect to both of the server side and the client side as has been described using FIG. 5. However, oftentimes, a situation occurs in which the user has performed the procedure of registration deletion only with respect to one of the server side and the client side, and forgets to perform the procedure with respect to the other. When the image forming apparatus 100, which is the client side, has accepted an instruction for deleting the registration, the image forming apparatus 100 can delete the registration information on both of the server side and the client side by performing the procedure of registration deletion for the printing server 200. However, when the printing server 200 has accepted the instruction to delete the registration, the printing server 200, in many cases, cannot be actively involved with the deletion of the registration information on the client side depending on the specifications of the server side, the condition of communication connection, or security policies. Especially, in a case where a business operator who manages the printing server 200 is different from a manufacturer of the image forming apparatus 100, it is difficult for the printing server 200 to be actively involved. In view of this, the image forming apparatus 100 incorporates a mechanism to avoid a situation in which the registration information on the client side is not deleted though the registration information on the server side has been deleted, as will be described in several working examples in the next section onward.

5. First Working Example

In the first working example, as stated above, the printing server 200 provides the cloud printing service to the image forming apparatus 100 using a pull approach. That is to say, the printing server 200 receives a query signal from the image forming apparatus 100 periodically, and in a case where there is a print job to be executed by the image forming apparatus 100, this print job is included in a response signal to the query signal and transmitted to the image forming apparatus 100.

Figure 6:
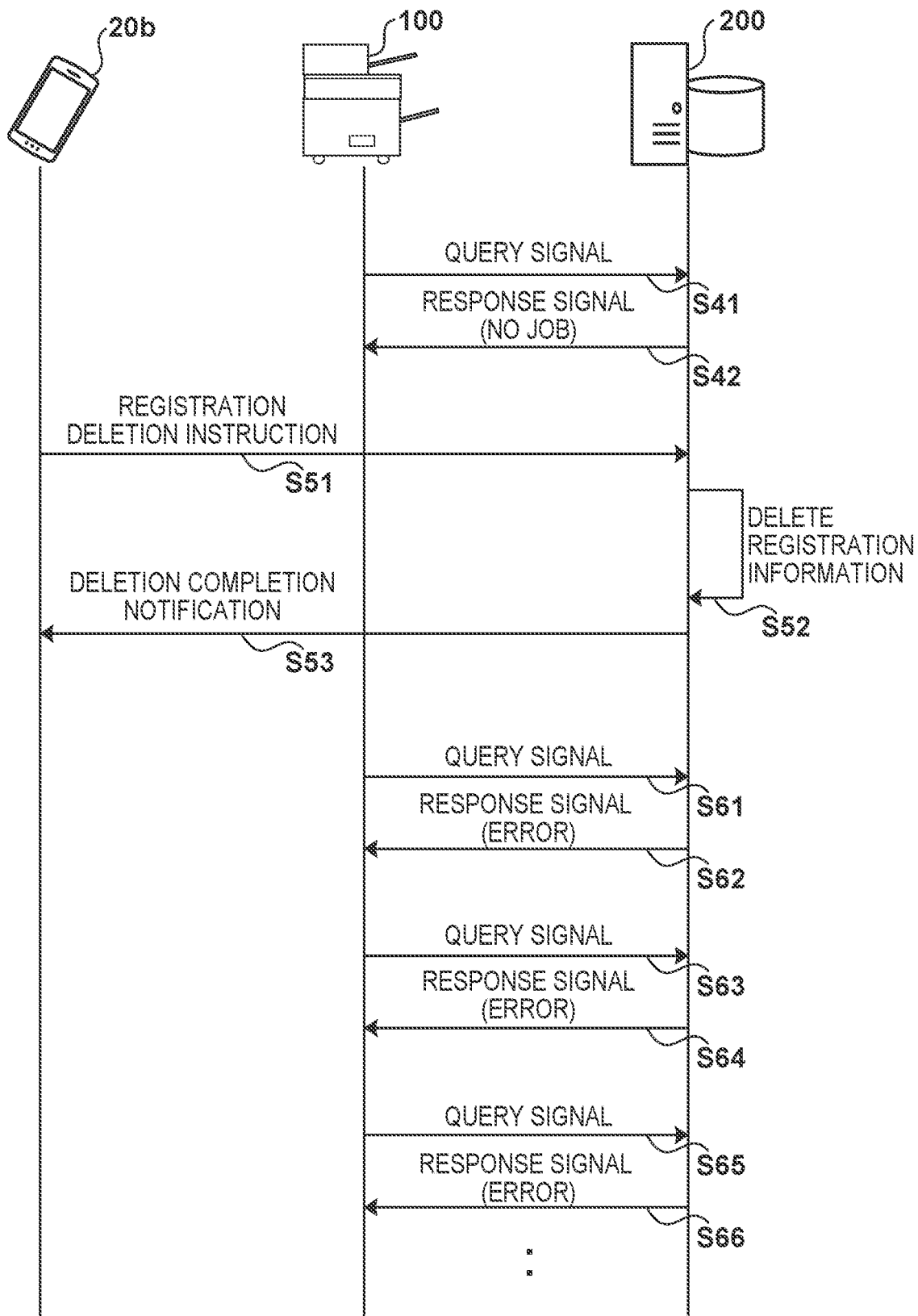
FIG. 6 is a sequence diagram for describing a scenario in which a waste of communication resources can occur in a first working example.

FIG. 6 is a sequence diagram for describing a scenario in which a waste of communication resources can occur as a result of deleting only the registration information on the server side in the first working example.

First, in step S41, the image forming apparatus 100 transmits a query signal to the printing server 200. In step S42, as there is no print job to be executed by the image forming apparatus 100, the printing server 200 returns a response signal to the query signal to the image forming apparatus 100 without including a print job therein.

Next, in step S51, the user accesses a registration management screen of the printing server 200 using the user terminal 20b, and instructs the printing server 200 to delete the registration of the image forming apparatus 100 from the cloud printing service. In response to the instruction from the user, the printing server 200 deletes the server-side registration information 220 stored in the print DB 204 in step S52. Next, in step S53, the printing server 200 transmits, to the user terminal 20b, a deletion completion notification for providing a notification about the completion of deletion of the registration information. Unlike the example of FIG. 5, the user thereafter does not perform the procedure of registration deletion with respect to the image forming apparatus 100.

The image forming apparatus 100, which is not aware of the fact that the registration has been deleted on the server side, transmits a query signal to the printing server 200 again in step S61. As the printing server 200 has received the query signal from the image forming apparatus 100 for which the registration has already been deleted, it returns a response signal representing an error signal to the image forming apparatus 100 in step S62. Such an exchange of a query and an error response occurs repeatedly unless the client-side registration information 112 is deleted in the image forming apparatus 100 (steps S63 to S66); this results in a waste of communication resources.

In order to prevent the aforementioned waste of communication resources, the communication control unit 130 of the image forming apparatus 100 determines whether the server-side registration information 220 has been deleted in the remote environment E2 based on a received signal that is received from the printing server 200 via the communication I/F 106. Then, in a case where the communication control unit 130 determines that the server-side registration information 220 has been deleted, it deletes the client-side registration information 112 stored in the storage 104. This received signal is a response signal that is returned in response to a query signal that is transmitted to the printing server 200 periodically.

Specifically, the communication control unit 130 can determine that the server-side registration information 220 has been deleted in the remote environment E2 in a case where the response signal from the printing server 200 indicates a preset error pattern. As an example, in a case where a query signal is transmitted as an IPP request, the response signal can indicate the following error pattern when the server-side registration information 220 has been deleted:

HTTP 200 OK, IPP 407 client error gone

As another example, in a case where a query signal is transmitted as an HTTP request, the response signal can indicate the following error pattern when the server-side registration information 220 has been deleted:

---

HTTP 400 bad request
Content: "error": "invalid_grant"
"error_code": 50155

---

Note that the error pattern that can be indicated by the response signal from the printing server 200 depends on the implementation of the printing server 200, and is not limited to the foregoing examples. For example, the communication control unit 130 may determine that the server-side registration information 220 has been deleted in the remote environment E2 in a case where an error code indicated by the response signal from the printing server 200 represents a preset code value.

An error pattern that is used as a basis for the determination about deletion of the server-side registration information 220 may be determined in advance and stored in the storage 104. Alternatively, a UI intended for a user to configure an error pattern that is used as a basis for the determination may be provided. By providing an error pattern that is configurable by a user, it will be possible to appropriately perform determination about deletion of registration deletion-using a changed error pattern without requiring any update of a program in a case where the specifications of the printing server 200 is altered and an error pattern indicated by a response signal is changed.

Figure 7:
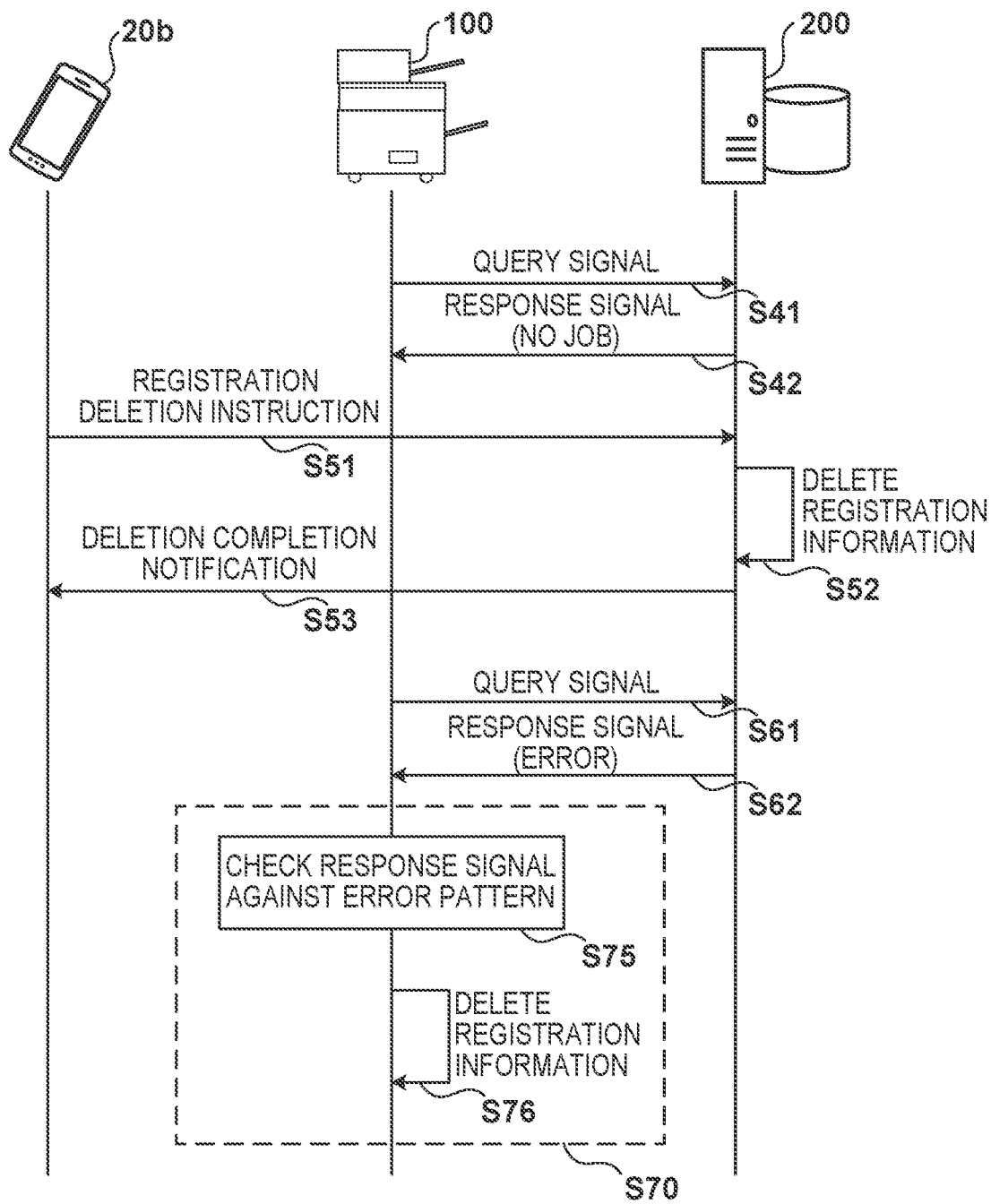
FIG. 7 is a sequence diagram showing an example of a flow of processing for preventing a waste of communication resources in the first working example.

FIG. 7 is a sequence diagram showing an example of a flow of processing for preventing a waste of communication resources in the first working example. As steps S41 to S53 of FIG. 7 are processing steps that are the same as steps S41 to S53 of FIG. 6, descriptions thereof are omitted here. In the example of FIG. 7, too, the user only performs the procedure of registration deletion with respect to the printing server 200 in steps S51 to S53, and does not perform the procedure of registration deletion with respect to the image forming apparatus 100.

In step S61, the communication control unit 130 of the image forming apparatus 100 causes the communication I/F 106 to transmit a query signal to the printing server 200. As the printing server 200 has received the query signal from the image forming apparatus 100 for which the registration has already been deleted, it returns a response signal representing an error signal to the image forming apparatus 100 in step S62. In step S75, the communication control unit 130 checks the response signal received from the printing server 200 against an error pattern indicating deletion of the server-side registration information 220. It is assumed here that the response signal matches the error pattern. In step S76, the communication control unit 130 determines that the server-side registration information 220 has been deleted, and deletes the client-side registration information 112 stored in the storage 104.

Figure 8:
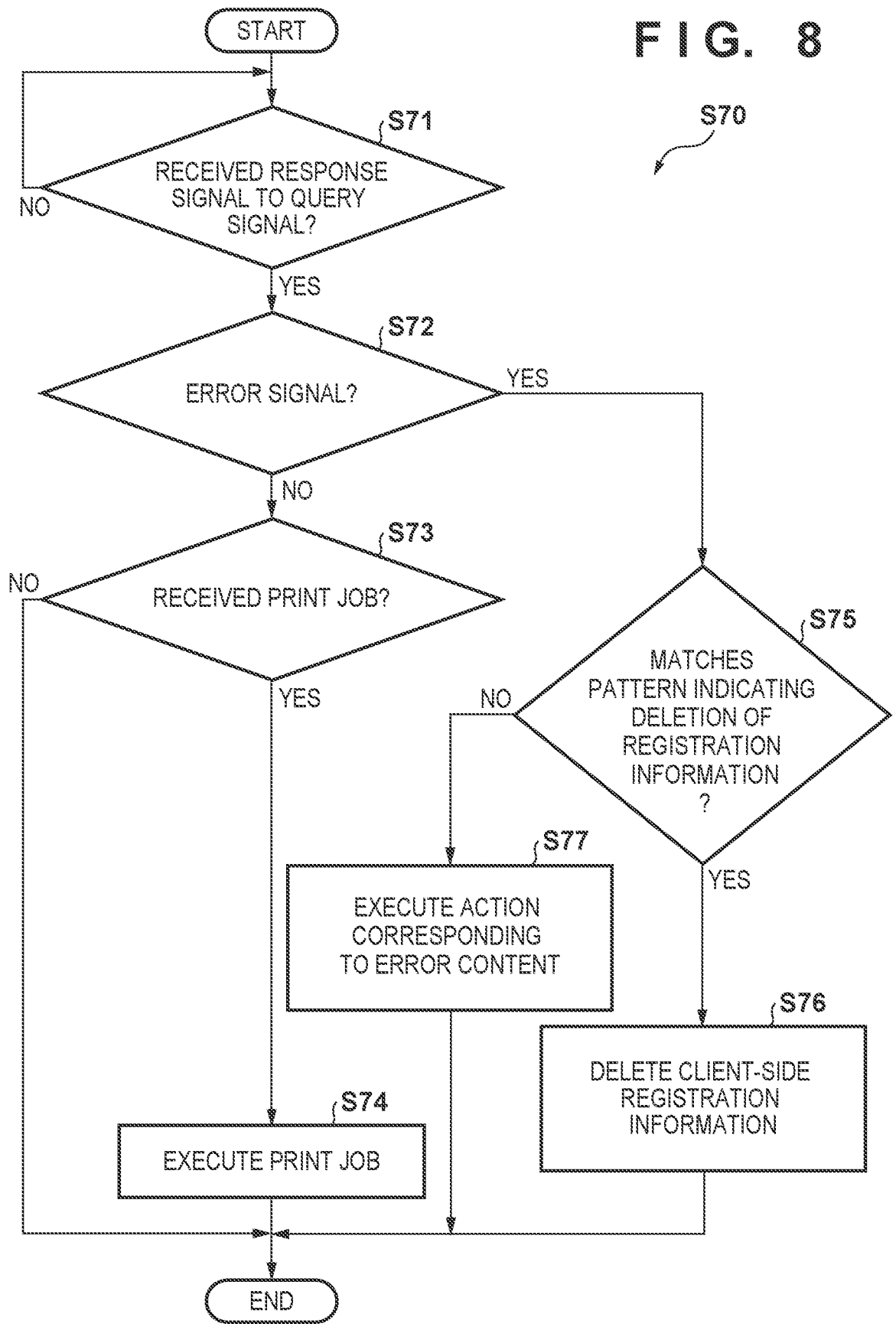
FIG. 8 is a flowchart showing an example of a flow of communication control processing that can be executed by the image forming apparatus in the first working example.

FIG. 8 is a flowchart showing an example of a flow of communication control processing S70 that can be executed by the image forming apparatus 100 in the first working example. The communication control processing S70 includes steps S75 and S76 of FIG. 7.

First, after a query signal has been transmitted to the printing server 200, the communication control unit 130 waits for reception of a response signal to the query signal in step S71. Once the communication I/F 106 has received a response signal from the printing server 200, processing proceeds to step S72.

Subsequently, processing branches depending on the content of the received response signal. For example, in a case where the response signal is not an error signal (S72—NO) and does not include a print job (S73—NO), no particular action is performed, and the communication control processing of FIG. 8 is ended. In a case where the response signal is not an error signal (S72—NO) and includes a print job (S73—YES), the printing unit 107 executes the print job under control of the print control unit 140 in step S74.

In a case where the response signal is an error signal (S72—YES), the communication control unit 130 determines whether the response signal matches an error pattern indicating deletion of the server-side registration information 220 in step S75. In a case where the response signal matches the error pattern (S75—YES), the communication control unit 130 deletes the client-side registration information 112 stored in the storage 104 in step S76. On the other hand, in a case where the response signal does not match the error pattern, the communication control unit 130 executes an action corresponding to the content of the error indicated by the response signal in step S77.

Thereafter, although not shown in FIG. 8, the communication control unit 130 may execute additional processing, such as recording of an operation history (i.e., a log) and display of a status to the user. Then, the communication control processing of FIG. 8 is ended.

6. Second Working Example

In the second working example, the printing server 200 provides the cloud printing service to the image forming apparatus 100 using a push approach and an event-driven approach. That is to say, in a case where there is a print job to be executed by the image forming apparatus 100, the printing server 200 can transmit this print job to the image forming apparatus 100 using the connection that is continuously maintained with the image forming apparatus 100.

Figure 9:
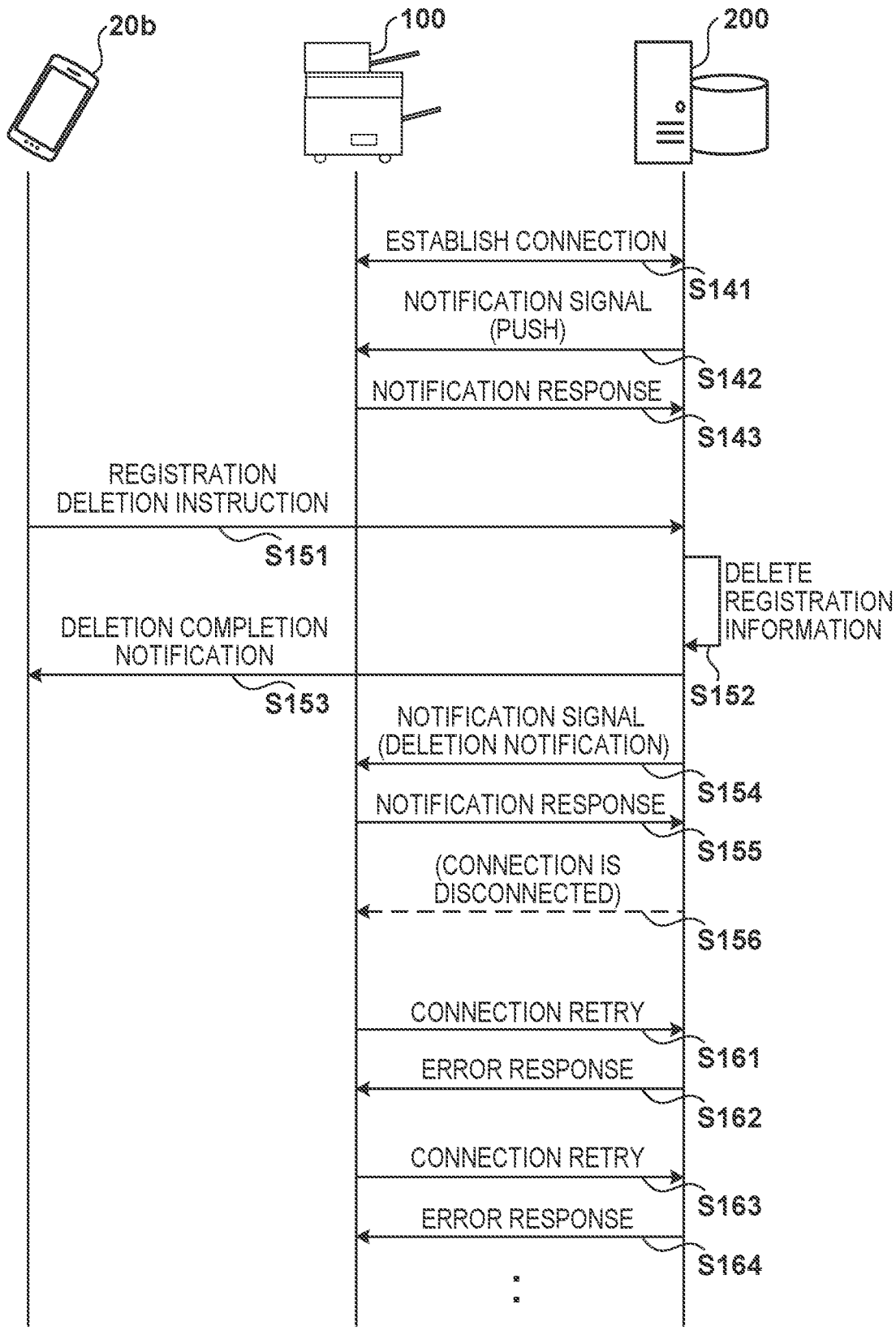
FIG. 9 is a sequence diagram for describing a scenario in which a waste of communication resources can occur in a second working example.

FIG. 9 is a sequence diagram for describing a scenario in which a waste of communication resources can occur as a result of deleting only the registration information on the server side in the second working example.

First, in step S141, processing for establishing communication connection (e.g., a handshake) is performed between the image forming apparatus 100 and the printing server 200. Thereafter, in step S142, on the occurrence of an event related to the image forming apparatus 100 (e.g., a print request), the printing server 200 transmits, to the image forming apparatus 100, a push-approach notification signal for providing a notification about the event that has occurred. Upon receiving the notification signal, the image forming apparatus 100 executes an action corresponding to the notified event, and also returns a response to the notification signal to the printing server 200 in step S143.

Next, in step S151, a user accesses a registration management screen of the printing server 200 using the user terminal 20b, and instructs the printing server 200 to delete the registration of the image forming apparatus 100 from the cloud printing service. In response to the instruction from the user, the printing server 200 deletes the server-side registration information 220 stored in the print DB 204 in step S152. Next, in step S153, the printing server 200 transmits, to the user terminal 20b, a deletion completion notification for providing a notification about the completion of deletion of the registration information. Unlike the example of FIG. 5, the user thereafter does not perform the procedure of registration deletion with respect to the image forming apparatus 100.

In step S154, the printing server 200 transmits, to the image forming apparatus 100, a push-approach notification signal for providing a notification indicating that the server-side registration information 220 has been deleted. In step S155, the image forming apparatus 100 returns a response to the notification signal to the printing server 200.

Even if the notification indicating that the server-side registration information 220 has been deleted has been provided at the application level in step S154, whether the communication connection established at the TCP/IP level is disconnected depends on the apparatus implementation. Although step S156, which is indicated by a dash arrow in FIG. 9, represents disconnection of the communication connection by the printing server 200, there is still a possibility that such disconnection is not performed. In a case where the client-side registration information 112 is not deleted and the communication connection is not disconnected, the image forming apparatus 100 continues periodical transmission of a connection signal for maintaining the communication connection with the printing server 200 (e.g., a keepalive signal). In a case where the communication connection has been disconnected but the client-side registration information 112 is not deleted, the image forming apparatus 100 periodically transmits a connection signal for attempting reestablishment of the communication connection with the printing server 200. FIG. 9 shows the latter case; the image forming apparatus 100 attempts reestablishment of the communication connection in step S161. The printing server 200 does not accept the connection from the image forming apparatus 100 for which the registration has already been deleted, and returns an error response to the image forming apparatus 100 in step S162. Such an exchange of a connection retry and an error response occurs repeatedly unless the client-side registration information 112 is deleted in the image forming apparatus 100 (steps S163 and S164); this results in a waste of communication resources.

In order to prevent the aforementioned waste of communication resources, the communication control unit 130 of the image forming apparatus 100 determines whether the server-side registration information 220 has been deleted in the remote environment E2 based on a push-approach notification signal that is received from the printing server 200. Then, in a case where the communication control unit 130 determines that the server-side registration information 220 has been deleted, it deletes the client-side registration information 112 stored in the storage 104.

Specifically, the communication control unit 130 determines that the server-side registration information 220 has been deleted in the remote environment E2 in a case where the notification signal received via the communication OF 106 is a signal defined to indicate that the server-side registration information 220 has been deleted. Then, in this case, the communication control unit 130 deletes the client-side registration information 112 stored in the storage 104, and also causes the communication OF 106 to stop the periodical transmission of a connection signal to the printing server 200.

In a case where the notification signal from the printing server 200 indicates that the server-side registration information 220 has been deleted, the communication control unit 130 may monitor the state of communication connection with the printing server 200 until a predetermined period elapses. In a case where the printing server 200 does not disconnect the communication connection even after the predetermined period has elapsed, the communication control unit 130 causes the communication OF 106 to disconnect the communication connection with the printing server 200. This makes it possible to promptly release resources of the communication OF 106 and utilize them for other communications.

Figure 10A:
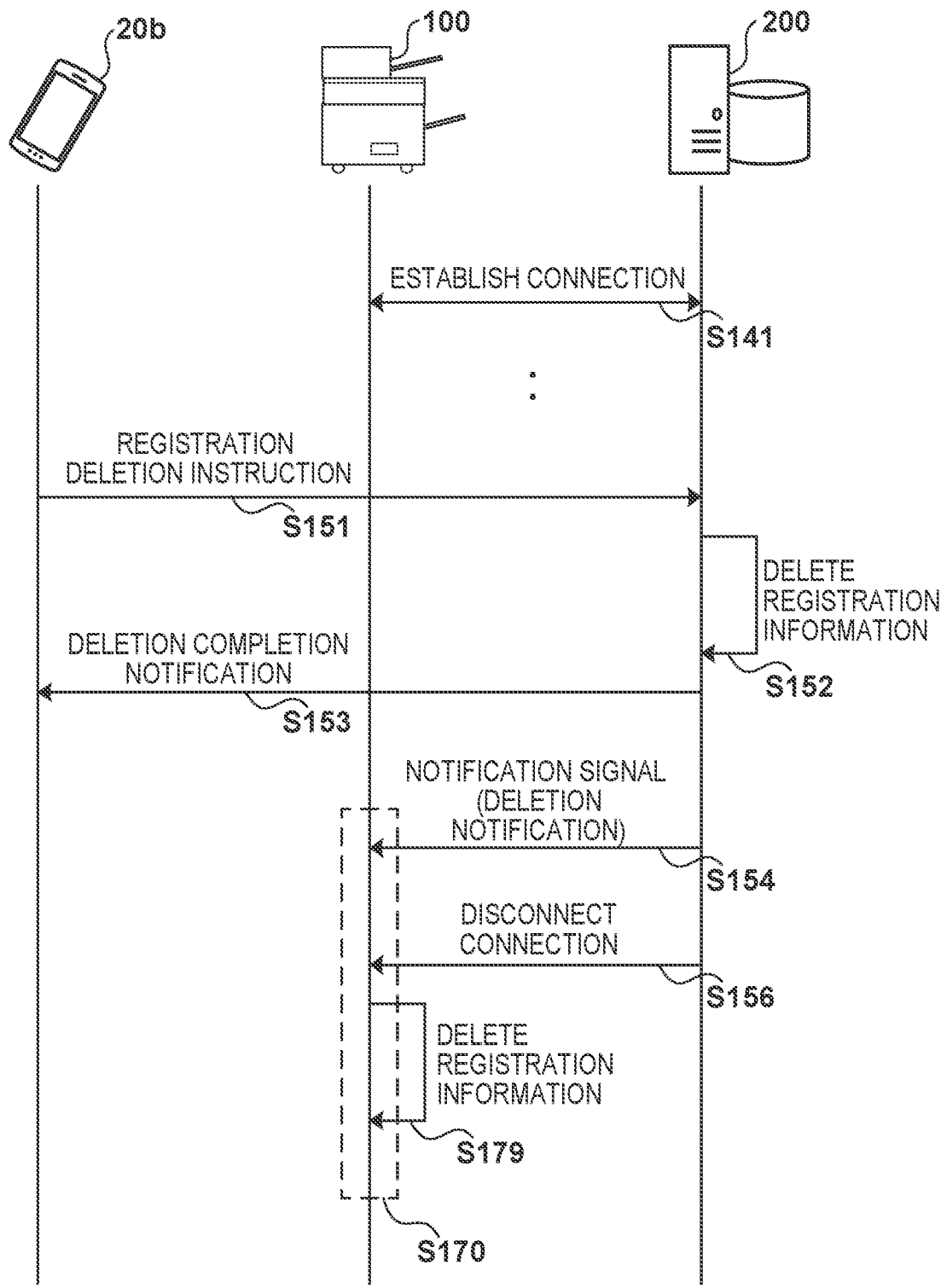
FIG. 10A is a sequence diagram showing a first example of a flow of processing for preventing a waste of communication resources in the second working example.

FIG. 10A is a sequence diagram showing a first example of a flow of processing for preventing a waste of communication resources in the second working example. As steps S141 to S153 of FIG. 10A are the same processing steps as steps S141 to S153 of FIG. 9, descriptions thereof are omitted here. In the example of FIG. 10A, too, the user only performs the procedure of registration deletion with respect to the printing server 200 in steps S151 to S153, and does not perform the procedure of registration deletion with respect to the image forming apparatus 100.

In step S154, the communication control unit 130 of the image forming apparatus 100 receives a notification signal from the printing server 200 via the communication OF 106, and determines that the server-side registration information 220 has been deleted in the remote environment E2 based on the received notification signal. Furthermore, in step S156, the communication control unit 130 detects that the communication connection between the communication OF 106 and the printing server 200 has been disconnected. Then, in step S179, the communication control unit 130 deletes the client-side registration information 112 stored in the storage 104. Thereafter, the communication control unit 130 no longer causes the communication OF 106 to attempt reestablishment of the communication connection with the printing server 200.

FIG. 10B is a sequence diagram showing a second example of a flow of processing for preventing a waste of communication resources in the second working example. As steps S141 to S153 of FIG. 10B are the same processing steps as steps S141 to S153 of FIG. 9, description thereof are omitted here. In the example of FIG. 10B, too, the user only performs the procedure of registration deletion with respect to the printing server 200 in steps S151 to S153, and does not perform the procedure of registration deletion with respect to the image forming apparatus 100.

In step S154, the communication control unit 130 of the image forming apparatus 100 receives a notification signal from the printing server 200 via the communication OF 106, and determines that the server-side registration information 220 has been deleted in the remote environment E2 based on the received notification signal. Next, in step S177, the communication control unit 130 stands by for a predetermined period while monitoring the state of communication connection with the printing server 200. It is assumed that, in the example of FIG. 10B, the printing server 200 does not disconnect the communication connection during this standby period. After the standby period has elapsed, the communication control unit 130 causes the communication I/F 106 to disconnect the communication connection with the printing server 200 in step S178. Then, in step S179, the communication control unit 130 deletes the client-side registration information 112 stored in the storage 104. Thereafter, the communication control unit 130 no longer causes the communication I/F 106 to attempt reestablishment of the communication connection with the printing server 200.

Figure 11:
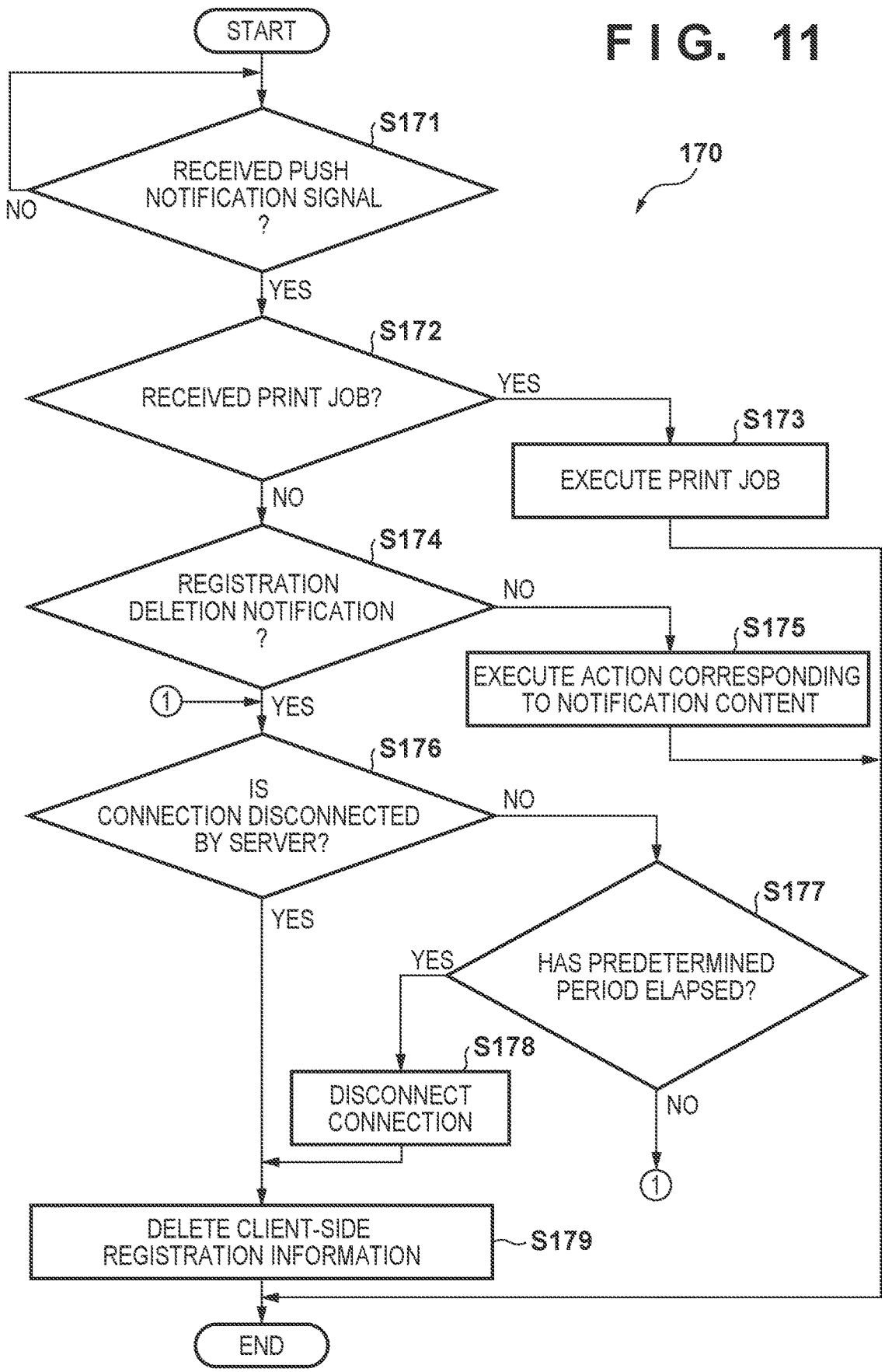
FIG. 11 is a flowchart showing an example of a flow of communication control processing that can be executed by the image forming apparatus in the second working example.

FIG. 11 is a flowchart showing an example of a flow of communication control processing S170 that can be executed by the image forming apparatus 100 in the second working example. The communication control processing S170 includes step S179 of FIG. 10A, and steps S177 to S179 of FIG. 10B.

First, in step S171, the communication control unit 130 waits for reception of a push-approach notification signal from the printing server 200. Once the communication I/F 106 has received a notification signal from the printing server 200, processing proceeds to step S172.

Subsequently, processing branches depending on the content of the received notification signal. For example, in a case where the notification signal includes a print job (S172—YES), the printing unit 107 executes the print job under control of the print control unit 140 in step S173.

In a case where the notification signal does not include a print job (S172—NO) and does not indicate that the server-side registration information 220 has been deleted (S174—NO), the communication control unit 130 executes an action corresponding to the content of the notification indicated by the notification signal in step S175.

In a case where the notification signal indicates that the server-side registration information 220 has been deleted (S174—YES), the communication control unit 130 determines whether the printing server 200 has disconnected the communication connection in step S176. This determination is repeated until it is determined that a predetermined period has elapsed in step S177. In a case where the predetermined period has elapsed without the printing server 200 disconnecting the communication connection (S177—YES), the communication control unit 130 causes the communication OF 106 to disconnect the communication connection with the printing server 200 in step S178. On the other hand, in a case where the printing server 200 has disconnected the communication connection before the predetermined period elapses (S176—YES), step S178 is skipped, and processing proceeds to step S179.

In step S179, the communication control unit 130 deletes the client-side registration information 112 stored in the storage 104. Thereafter, although not shown in FIG. 11, the communication control unit 130 may execute additional processing, such as recording of an operation history (i.e., a log) and display of a status to the user. Then, the communication control processing of FIG. 11 is ended.

7. Third Working Example

In the first working example and the second working example, in a case where it is determined that the server-side registration information 220 has been deleted based on a received signal that has been received from the printing server 200, the client-side registration information 112 registered in the local environment E1 is automatically deleted. In contrast, in a third working example described in the present section, a user can select an action to be executed by the image forming apparatus 100 in a case where it is determined that the server-side registration information 220 has been deleted. Note that the determination about whether the server-side registration information 220 has been deleted may be made using any of the methods that have been described in the previous sections.

Figure 12:
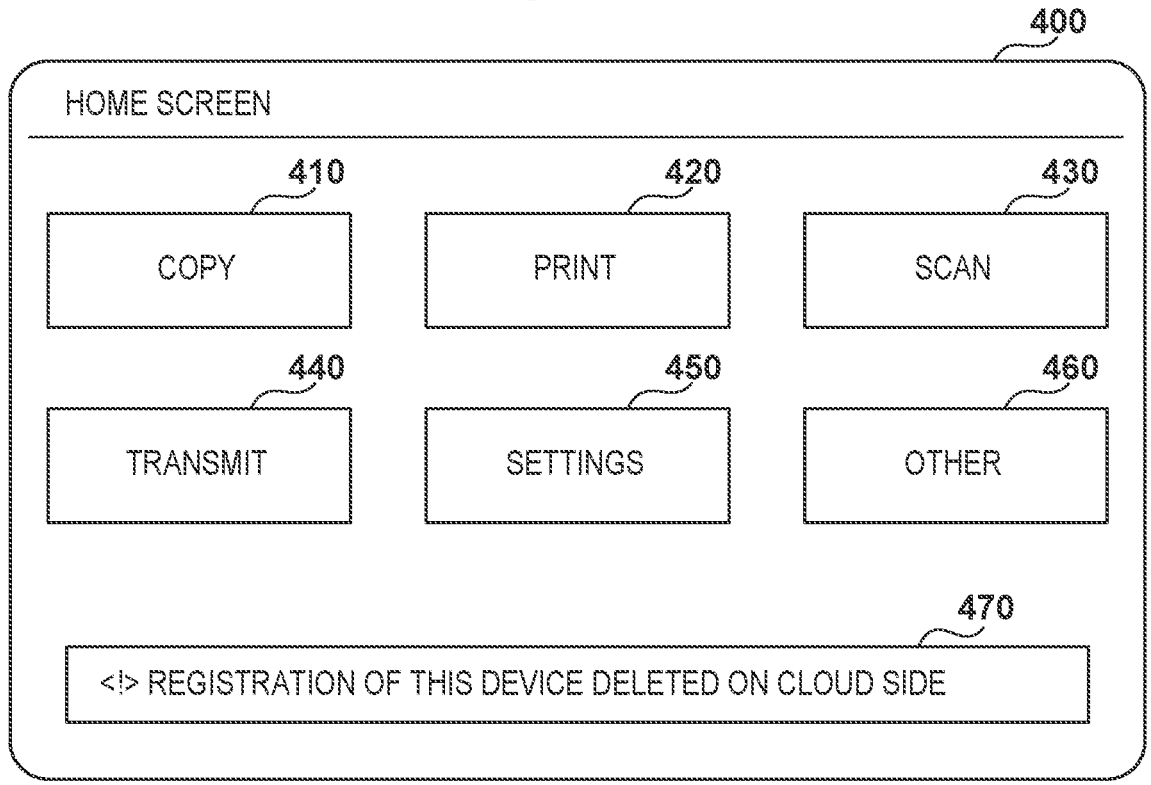
FIG. 12 is an explanatory diagram showing an example of a GUI that displays a status of service registration.

For example, in a case where it is determined that the server-side registration information 220 has been deleted, the communication control unit 130 presents a plurality of options for the action, including the deletion of the client-side registration information, to the user via a user interface. Then, in a case where the user has selected the deletion of the client-side registration information, the communication control unit 130 deletes the client-side registration information 112 stored in the storage 104. The options for the action that are presented to the user may include, in addition to the deletion of the client-side registration information, for example, one or more of the followings:

Stop communication with printing server without deleting client-side registration information Refrain from deleting client-side registration information, and also from stopping communication with printing server FIG. 12 shows a home screen 400 as an example of a GUI that displays a status of service registration, which can be displayed by the operation unit 105 or a remote UI of the image forming apparatus 100. In the example of FIG. 12, the home screen 400 includes six function buttons 410, 420, 430, 440, 450, and 460, and a status display section 470. The function buttons 410, 420, 430, 440, 450, and 460 are buttons for calling up a copy function, a print function, a scan function, a data transmission function, a setting function, and other functions, respectively. The status display section 470 is a section for displaying messages related to various statuses of the image forming apparatus 100. In the example of FIG. 12, the status display section 470 displays a message that provides a notification indicating that the server-side registration information has been deleted in the printing server 200. For example, when the user has touched the status display section 470, the GUI makes a transition to an action selection screen 500 shown in FIG. 13.

Figure 13:
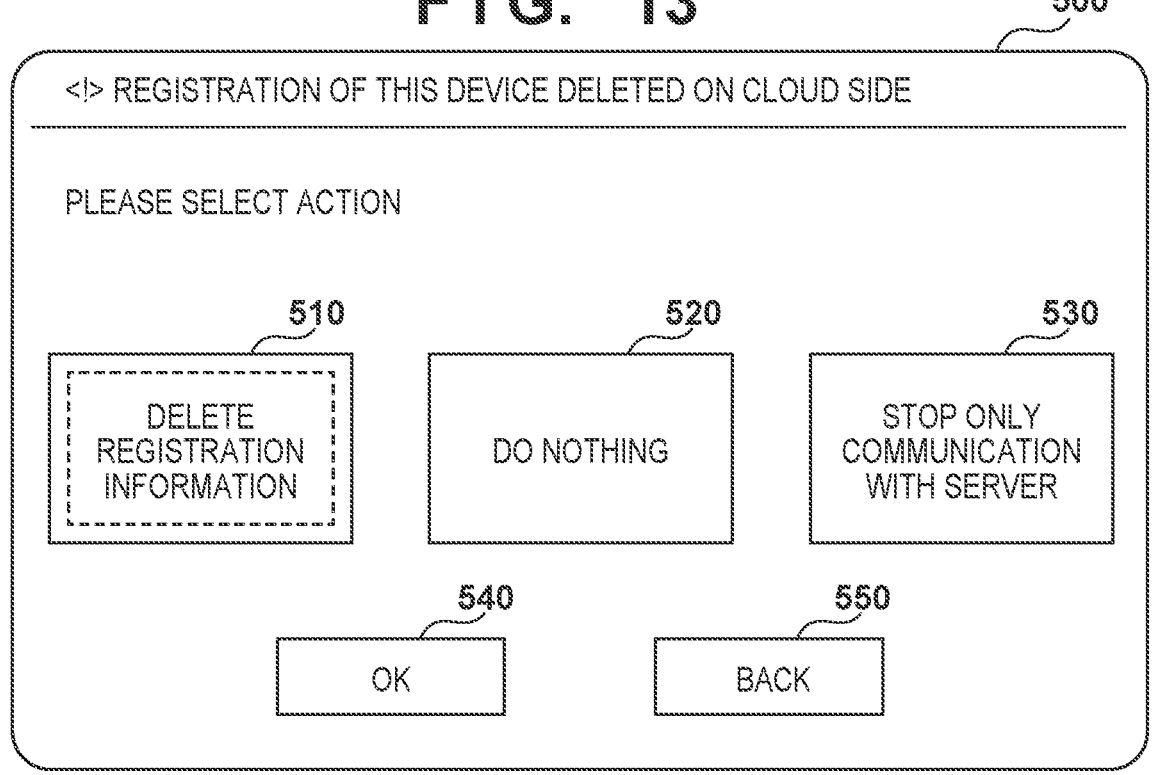
FIG. 13 is an explanatory diagram showing examples of options that are presented to a user in a case where it is determined that server-side registration information has been deleted.

FIG. 13 shows an example of the action selection screen 500 for presenting, to the user, a plurality of options for the action to be executed in a case where it is determined that the server-side registration information has been deleted. In the example of FIG. 13, the action selection screen 500 includes three action buttons 510, 520, and 530, an OK button 540, and a return button 550. The action button 510 is a button for selecting an action of deleting the client-side registration information. The action button 520 is a button for selecting an action of doing nothing. The action button 530 is a button for selecting an action of stopping communication with the printing server 200 without deleting the client-side registration information. When the user has selected one of the three action buttons 510, 520, and 530 and operated the OK button 540, the communication control unit 130 executes the action corresponding to the selected action button. When the user operates the return button 550, the GUI makes a transition to the home screen 400 shown in FIG. 12.

In the present working example, in a case where it is determined that the server-side registration information has been deleted, the client-side registration information is not deleted unless the user selects the option of deleting the client-side registration information (or unless the user gives an approval therefor). For example, by leaving the client-side registration information without deleting the same, the client-side registration information can be reused when the use of the cloud printing service is resumed in the future. Furthermore, by providing the option of stopping only communication with the printing server 200, the amount of consumption of communication resources can be reduced while leaving the client-side registration information.

8. Summary

Using FIG. 1 to FIG. 13, the above has described various embodiments and working examples of the technology pertaining to the present disclosure. According to the above-described embodiments, on an image forming apparatus that forms an image in accordance with a print job received from a server apparatus that operates in a remote environment, whether registration information for communication connection has been deleted on the server side is determined based on a received signal received from this server apparatus. Then, in a case where it is determined that the registration information has been deleted on the server side, the image forming apparatus deletes registration information stored on the client side. Therefore, even if a user has performed the procedure to delete registration information for communication connection only with respect to the server side, a situation is avoided in which registration information on the client side to be deleted is left undeleted in the local environment. In this way, meaningless transmission of signals from the image forming apparatus to the server apparatus is not repeated, and thus a waste of communication resources is prevented.

In a working example, the server apparatus transmits, to the image forming apparatus, a print job to be executed by the image forming apparatus via communication using the pull approach, and the received signal is a response signal to a query signal in the communication using the pull approach. Such communication using the pull approach normally relies on periodical transmission of a query signal from the client side to the server side. Then, according to the aforementioned mechanism, as registration information is deleted also on the client side in line with the deletion of registration information on the server side, transmission of a query signal that has become unnecessary can be stopped in a timely manner in a situation in which the printing service is no longer provided. For example, it can be determined that registration information has been deleted on the server side in a case where the received signal indicates a preset error pattern. According to such a configuration, the image forming apparatus can adopt a function of making a determination about the deletion of registration on the server side, without modifying a typical implementation of the server apparatus where an error signal is returned to a query signal from an unregistered image forming apparatus. This configuration is particularly suitable for a use case in which a variety of image forming apparatuses utilize a common platform of a cloud printing service.

In a working example, communication connection between the server apparatus and the image forming apparatus is continuously maintained, and the server apparatus uses this communication connection to transmit a print job to be executed by the image forming apparatus to the image forming apparatus via communication using the push approach. The above received signal is a notification signal based on the push approach transmitted from the server apparatus, too. In a case where such communication using the push approach is performed, in general, transmission of some sort of connection signal is repeated between the client side and the server side to maintain the communication connection, or to reestablish connection when the connection is lost. Then, according to the aforementioned mechanism, as registration information is deleted also on the client side in line with the deletion of registration information on the server side, transmission of a connection signal that has become unnecessary can be stopped in a timely manner in a situation in which the printing service is not provided. For example, the received signal can be a notification signal (a deletion notification) that has been defined to indicate that registration information has been deleted on the server side. In this case, when registration information has been deleted on the server side, the image forming apparatus can immediately receive the deletion notification and delete registration information on the client side.

Note that although the present specification has mainly provided a description of an example in which the server apparatus is a cloud server that provides the cloud printing service, the technique pertaining to the present disclosure is also applicable to a network-type printing service that is not necessarily relies on the cloud technology. For example, the server apparatus may be a web server or an application server that is implemented without using the cloud technology.

9. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-162668, filed on Oct. 7, 2022 which is hereby incorporated by reference herein in its entirety.

What is claimed is:

1. An image forming apparatus, comprising:
an image forming unit;
a communication interface configured to be connected to a cloud server system;
a storage unit configured to store client-side registration information for connection with the cloud server system; and
a control unit configured to, in a case where a print job has been received from the cloud server system via the communication interface, control the image forming unit to form an image by executing the print job,
wherein the cloud server system is configured to communicate with the image forming apparatus using server-side registration information which is intended for the connection with the image forming apparatus, and
the control unit is configured to
in response to the server-side registration information being deleted by the cloud server system, accept a user input indicating deletion of the client-side registration information, and
delete the client-side registration information stored in the storage unit based on the user input.

2. The image forming apparatus according to claim 1, wherein
in a case where there is a print job to be executed by the image forming apparatus, the cloud server system transmits the print job to the image forming apparatus in response to a query signal received from the image forming apparatus,
the communication interface is configured to periodically transmit the query signal to the cloud server system, and the control unit is configured to determine that the server-side registration information has been deleted based on a received signal that is received from the cloud server system in response to the query signal.

3. The image forming apparatus according to claim 2, wherein
the control unit is configured to determine that the server-side registration information has been deleted in a case where the received signal indicates a preset error pattern.

4. The image forming apparatus according to claim 3, wherein
the error pattern is configurable by a user.

5. The image forming apparatus according to claim 1, wherein
the communication interface is configured to continuously maintain the connection with the cloud server system,
in a case where there is a print job to be executed by the image forming apparatus, the cloud server system transmits the print job to the image forming apparatus using the connection maintained with the image forming apparatus, and
the control unit is configured to determine that the server-side registration information has been deleted based on a received signal that is a notification signal transmitted from the cloud server system using the connection.

6. The image forming apparatus according to claim 5, wherein
the control unit is configured to determine that the server-side registration information has been deleted in a case where the notification signal is a signal that has been defined to indicate that the server-side registration information has been deleted.

7. The image forming apparatus according to claim 5, wherein
the communication interface is configured to periodically transmit, to the cloud server system, a connection signal for maintaining or reestablishing the connection with the cloud server system, and
in a case where it is determined that the server-side registration information has been deleted, the control unit is configured to cause the communication interface to stop the transmission of the connection signal to the cloud server system.

8. The image forming apparatus according to claim 5, wherein
in a case where it is determined that the server-side registration information has been deleted, the control unit is configured to cause the communication interface to disconnect the connection when the cloud server system does not disconnect the connection after a predetermined period has elapsed.

9. The image forming apparatus according to claim 1, wherein
in response to the server-side registration information being deleted by the cloud server system, the control unit is configured to present a plurality of options including the deletion of the client-side registration information to a user via a user interface, and
the plurality of options further include at least one of
stopping communication with the cloud server system without deleting the client-side registration information, and
refraining from deleting the client-side registration information, and also from stopping communication with the cloud server system.

10. The image forming apparatus according to claim 1, wherein
the cloud server system is capable of deleting the server-side registration information in response to an instruction received from a terminal apparatus that is located outside a local environment in which the image forming apparatus operates.

11. The image forming apparatus according to claim 1, wherein
the cloud server system is configured to provide a cloud printing service.

12. A communication control method executed by an image forming apparatus capable of communicating with a cloud server system, wherein
the image forming apparatus includes a storage unit configured to store client-side registration information for connection with the cloud server system,
the cloud server system is configured to communicate with the image forming apparatus using server-side registration information which is intended for the connection with the image forming apparatus, and
the image forming apparatus is configured to, in a case where a print job has been received from the cloud server system, form an image by executing the print job,
the communication control method comprising:
in response to the server-side registration information being deleted by the cloud server system, accepting a user input indicating deletion of the client-side registration information; and
deleting the client-side registration information stored in the storage unit based on the user input.

13. A non-transitory computer-readable storage medium having stored therein a computer program for an image forming apparatus capable of communicating with a cloud server system, wherein
the image forming apparatus includes a storage unit configured to store client-side registration information for connection with the cloud server system,
the cloud server system is configured to communicate with the image forming apparatus using server-side registration information which is intended for the connection with the image forming apparatus,
the image forming apparatus is configured to, in a case where a print job has been received from the cloud server system, form an image by executing the print job, and
when executed by a processing circuit of the image forming apparatus, the computer program causes the processing circuit to
in response to the server-side registration information being deleted by the cloud server system, accept a user input indicating deletion of the client-side registration information; and
delete the client-side registration information stored in the storage unit based on the user input.

* * * * *